United States Patent Office 3,594,176
Patented July 20, 1971

3,594,176
PROTECTION OF FATTY MATERIALS
Leo Morris, Melrose Park, Ill., assignor to
CPC International Inc.
No Drawing. Filed Oct. 9, 1967, Ser. No. 673,995
Int. Cl. A23k 1/00; A23j 1/12
U.S. Cl. 99—2F                                    13 Claims

ABSTRACT OF THE DISCLOSURE

The present invention is directed to an oxidatively stable free-flowing, non-staining product of high fat content useful both in feed formulations and as a food component and to the process for the preparation thereof. In the process of the present invention, lipids are mixed thoroughly with undried gluten obtained from the commercial wet milling process of corn or grain sorghum. The mixture is then dried to yield a product of high fat content which does not bleed. Suitable lipids for use in the product include soapstocks, vegetable oils or fats, starch fat, animal fat, grease, tallow, and the like. The mixture will contain between 50% and 95% dry basis of the wet gluten and between 50% and 5% dry basis of the lipids. Additional constituents may be added to enhance either the flavor or the food value. Such additives include acids, steepwater, or other suitable additives.

---

The present invention relates to the preparation of an oxidatively stable free-flowing, non-staining product of high fat content useful both in feed formulations and as a food component.

Animal feeds are most desirably high in both fat content and protein. Such feed formulations may have the draw-back of "bleeding." Bleeding is the migration of the fat from the feed formulation to the exterior of the feed and frequently the fat permeates the exterior surface of the feed formulation container. Similar problems may occur with food compositions such as instant soups, sauces, or gravies. In this case, special packaging is required which will not allow permeation of fat.

Many attempts have been made to prevent bleeding by coating fat particles with protein or carbohydrates. Such methods are costly and hence undesirable.

It is an object of the present invention to provide a method for binding fatty materials in animal feed formulations.

It is a further object of the present invention to provide a method for binding of fatty materials to be used in a food composition.

It is still another object of the present invention to provide an animal feed formulation of high protein and high fat content wherein the fat is protected from bleeding.

Other objects and advantages of the present invention will be apparent hereinafter from the specification and from the appended claims.

The invention is directed to the discovery that the admixture of fat and wet corn or grain sorghum gluten followed by drying provides a high fat high protein foodstuff having non-bleeding characteristics.

Gluten is a high protein by-product obtained from the wet milling of grains such as corn and grain sorghum. The product is of high caloric value, may contain carotenoids, and is of high food value. The gluten suitable for use in the present invention is that obtained from corn or grain sorghum. The gluten must be wet gluten, i.e., that which has not been dried since its separation from the grain by the wet milling process involving steeping in sulfur dioxide, water, milling and separation by known means. Use of the term "gluten" hereinafter shall be limited to wet gluten as defined above.

The present invention provides a food component suitable for use in animal feeds or human food products, comprising an admixture of between about 50% and about 95% dry basis of wet gluten, said gluten having a moisture content of at least about 40%, preferably between about 40% and about 65%, and between about 50% and about 5% lipids (fats), dry basis. After drying to a moisture content less than 10%, the resulting free-flowing product is useful in foodstuffs wherein a high fat content is desired. For example, the gluten protected fat is particularly useful in soups, sauces, and the like.

The present invention also provides a process for preparing food components which comprises admixing wet gluten and a lipid, the gluten being present in an amount between about 50% and about 95% and drying the admixture to obtain a free-flowing product. The moisture content of the final product is preferably less than 10% and most preferably less than 6%.

In the instant invention, lipids are mixed thoroughly with undried gluten which is obtained from the commercial wet milling of corn or grain sorghum. The mixture is dried in a conventional manner. Almost any lipid or lipid concentrate can be used. Suitable lipids include soapstocks, either acidulated or alkaline, from the refining of corn, sorghum, soybean, safflower, sunflower, peanut or similar oils and fats, crude vegetable oils, starch fat, animal fats, such as grease and tallow and the like. In the preparation of the products of the present invention, fats suitable for foods and feeds should be used. Among the more preferred lipids are vegetable oils and vegetable oil soapstocks obtained from refining processes for oils. These lipids are plentiful and inexpensive.

The carotenoid containing lipids are particularly suitable for use in the present invention. An example is corn endosperm oil which contains one to three grams of xanthophyll per pound of oil. Other fatty carotenoid concentrates are suitable as are solutions of synthetic carotenoids in lipids.

Regardless of the lipid constituent, the substrate, i.e., gluten, should be corn gluten or grain sorghum gluten. These materials are prepared by the wet milling of corn or grain sorghum and usually contain more than 60% protein, dry basis. The protein is primarily derived from the endosperm of the seed.

In preparing the products of this invention, it is necessary to start with undried corn or sorghum gluten, the moisture content thereof being in excess of 40%. The lipids are mixed with the wet gluten and the mixture then dried. It has been found that commercially dried gluten when rehydrated provides no protection to the fatty materials to prevent "bleeding." It is therefore quite unexpected to find that gluten direct from the wet milling process prevents "bleeding" and thus binds or protects the fat.

The gluten and fat are mixed together by any simple blending method in a conventional mixing device. An example of a suitable mixer is a dough mixer which has adjustable speeds, and which is capable of thoroughly mixing materials as heavy as gluten press cake and viscous fats. Gluten press cake is the filter cake obtained when the gluten is first removed and filtered from the wet milling process. The press cake contains at least 40% water, and preferably 40% to 65% moisture.

Although any proportion of constituents may be used, the best results are obtained when the final composition contains between about 50% and about 95% gluten, and between about 50% and about 5% lipids. Most preferably the gluten is present in an amount of between about 65% and about 95% and the lipid is present in an amount of about 35% and about 5%. Free-flowing, non-bleeding products containing up to say about 40% fat have been easily prepared.

Conventional drying procedures are satisfactory to remove water from the product mixture. For example, a forced air oven at a temperature of about 80° C., a vacuum oven at about 70° C., or a lyophilizer may be used. A flash dryer has also been proven successful.

Other components may be added to the composition to stabilize it against oxidation or make it more palatable. Animal feed products may be stabilized by the addition of corn or grain sorghum steepwater, also a wet milling byproduct which contains appreciable quantities of lactic acid. This is particularly advantageous wherein alkaline soapstock is the source of fat because at an alkaline pH soapstocks are not well tolerated by animals. Adjustment of the pH to about 6.5 makes the feedstuff palatable and much more easily digestible. The steepwater is added in an amount so as to constitute between about 5% and about 25% of the final product, dry basis. More or less may be added with commensurate benefit. Ethoxyquin may be useful as an additive when carotenoid is included in the composition because the ethoxyquin protects carotenoids from destructive oxidation.

In preparing the above-described products for human food use, the addition of metal deactivators to prevent oxidation of the fat, may be desirable, such as ethylenediaminetetraacetic acid, citric, lactic, phosphoric, or tartaric acids and their salts. As in the animal feed preparation, it may also be desirable to add food grade acid or alkali to adjust the pH to about 6.5. Suitable food products in which the gluten-fat preparation might be used include those of high fat content wherein a free-flowing powder is desired such as soups, sauces, gravies and the like. Advantages of this product are its ready dispersibility in water, its economy in shipment, and its suitability for blending with other dry ingredients.

The invention will now be described in further detail by means of several exemplary demostrations thereof.

EXAMPLE 1

According to the practice of the present invention, neutralized corn oil soapstock was prepared by adding hydrochloric acid to alkaline corn oil soapstock to bring the pH to 4. The entire material was then dried under vacuum. The dried fat (25 parts) was mixed in a dough mixer with 150 parts of corn gluten having a water content of 50%. The resulting paste was dried in a circulating air oven at 80° C. The product, after grinding, was a dry free-flowing powder which after 30 days of storage exhibited no significant bleeding when held in contact with paper.

EXAMPLE 2

Alkaline corn oil soapstock (45% dry substance) was neutralized to a pH of 7 with corn steepwater containing 58% dry substance. The resulting slurry was mixed with corn gluten containing 59% moisture so that the final composition on a dry basis contained 45% soapstock, 20% steepwater, and 35% gluten. The mixture was dried in a circulating air oven and ground to yield a dry free-flowing powder which retained its fat when held in contact with paper for at least 30 days.

EXAMPLE 3

Several samples were made in which soybean oil soapstock was the chief lipid source. The same general procedure as used before was used in preparation of each of the samples. The alkaline soapstock was mixed into the corn gluten in a blender and the resulting paste dried at 80° C. in a circulating air oven. The corn gluten contained 60% water and 50% of the soy soapstock was water; however, all percentages in Table 1 are on a dry basis.

In some samples concentrated steepwater, 50% dry substance, was added. In these cases, the steepwater was mixed with the soapstock prior to the addition to the wet gluten. Oxidative stability of these samples was good as shown by the half-life of the carotenoids; the addition of steepwater greatly improved the oxidative stability. The results are found in Table 1 below.

TABLE 1

| Composition (percent dry basis) | | | Physical character | Carotenoid half-life (weeks at 50° C.) |
|---|---|---|---|---|
| Corn gluten | Soy Soapstock | Steepwater | | |
| 95 | 5 | 0 | Free-flowing | 4 |
| 90 | 5 | 5 | do | 6 |
| 65 | 35 | 0 | do | 2 |
| 55 | 35 | 10 | do | 5 |
| 85 | 15 | 0 | do | 3 |
| 80 | 15 | 5 | do | 4 |
| 75 | 15 | 10 | do | 6 |
| 60 | 40 | 0 | do | 2 |
| 62 | 28 | 10 | do | 7 |
| 52 | 36 | 12 | do | 8 |

Even at the highest concentration of soy soapstock, the fat did not bleed from the product when the product was stored in a paper container for 30 days. As may also be seen from Table 1, the carotenoid stability in the presence of steepwater was excellent.

EXAMPLE 4

Grain sorghum gluten in an amount of 50 grams and containing 40% water was slurried with 35 grams of an alkaline soapstock made from soybean oil. The soapstock contained 40% water. Sufficient water was added in the mixture to bring the water content to 22%. Hydrochloric acid was then added to adjust the pH to about 6.3. The composition was then subjected to lyophilization to produce a dry powdery product which was non-greasy and which retained its fat when held in contact with paper over a period of at least 30 days.

EXAMPLE 5

This example illustrates the use of corn endosperm oil as both the lipid source and carotenoid source for animal feed formulations. Corn gluten in the amount of 50 grams and containing 40% water was thoroughly mixed with 3 grams of corn endosperm oil, 21 grams of concentrated corn steepwater (50% solids) and 36 grams of water. The slurry was lyophilized to yield a dry, free-flowing powder which retained the fat even when subjected to pressure. The carotenoid stability was excellent, exhibiting a half-life at 50° C. of 8 weeks.

EXAMPLE 6

A preparation similar to that of Example 5 was made in which grain sorghum gluten was used. In this case, 50 grams of gluten containing 60% water was slurried with 2.2 grams of corn endosperm oil and 81 ml. of water. Lyophilization again gave a free-flowing powder which retained its fat well. The carotenoid pigments had a half-life of two weeks at 50° C. This is surprisingly high in view of the fact that no oxidation inhibitors had been added.

EXAMPLE 7

This example illustrates the use of refined corn oil as the fat source. Corn gluten in the amount of 125 grams and containing 40% water, was mixed with 25 grams of refined corn oil. This mixture was then dried in a circulating air oven at 80° C. until the moisture content of the product was less than 8%. The product was a dry free-flowing powder.

EXAMPLE 8

The product of the present invention may be used in human food products as well as animal feed products. For instance, the substantially dry product may be used in soups, sauces, gravies and other food products which generally contain a protein-containing flour and fat. The proportion of gluten to fat is substantially the same as that used for the animal feed component.

In a typical example, corn gluten and corn oil were admixed in 50–50 portions. The corn gluten contained about 60% moisture. The product was dried to a moisture content of less than 10%. After drying, metal deactivators were added in the amount of about 0.15% of ethylenediaminetetraacetic acid sodium salt and about 0.05% of calcium citrate. The resulting product in the quantity of 270 grams was combined with the following substantially dry ingredients:

| | Grams |
|---|---|
| Potato | 50 |
| Tomato | 290 |
| Lecithin | 2 |
| Skimmed milk, dry non-fat solids | 168 |
| Salt | 70 |
| Glutamate | 10 |
| Sugar | 40 |

Upon rehydration the combined product provided a thick vegetable soup of excellent flavor wherein the fat was completely dispersed in the aqueous phase.

The processes and products described above provide the food and animal feed industries with a highly desirable protein and fat combination. The processes are simple and economical and the products are in a physical form such that packaging, shipping, and use are easily carried out at low cost.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

I claim:

1. A process for the preparation of a composition suitable for use as a food component comprising admixing wet gluten from a wet milling process and a lipid, the gluten being present in amounts between about 50% and about 95%, on a dry basis, the lipid being present in amounts between about 5% and about 50%, on a dry basis, and drying the admixture to a moisture content of less than about 10% to obtain a free-flowing product.

2. A process as in claim 1 wherein the wet gluten is obtained from the wet milling of a grain selected from the group consisting of corn and grain sorghum.

3. A process as in claim 1 wherein the lipid is selected from the group consisting of vegetable oil and soapstock.

4. A process as in claim 1 wherein the wet gluten contains about 60% moisture.

5. A process as in claim 1 wherein steepwater is added to the admixture in an amount between about 5% and about 20% by weight.

6. A process as in claim 1 wherein the lipid is present in an amount between about 5% and about 35%, on a dry basis, and the gluten is present in an amount between about 65% and about 95%, on a dry basis.

7. A process as in claim 1 wherein minor portions of an additive selected from the group consisting of ethylenediaminetetraacetic acid, citric acid, lactic acid, phosphoric acid, tartaric acid, their salts and mixtures thereof are added to the admixture.

8. A dried free-flowing compound produced by the process of claim 1.

9. A dried free-flowing food component produced by the process of claim 2.

10. A dried free-flowing food component produced by the process of claim 3.

11. A dried free-flowing food component produced by the process of claim 3, wherein the lipid is a vegetable oil soapstock selected from the group consisting of soybean oil soapstock and corn oil soapstock.

12. A dried free-flowing food component produced by the process of claim 5, wherein said steepwater is selected from the group consisting of corn steepwater and grain sorghum steepwater.

13. A product as in claim 12 wherein equal parts of wet gluten and lipids are admixed with steepwater so as to obtain a final produce containing between about 5% and about 25% steepwater solids, on a dry basis.

References Cited

UNITED STATES PATENTS

| | | | |
|---|---|---|---|
| 3,290,152 | 12/1966 | Hartman | 99—17 |
| 3,351,531 | 11/1967 | Noznick | 99—14 |
| 920,108 | 5/1909 | Breyer | 99—2 |
| 2,924,525 | 2/1960 | Kruse et al. | 99—2C |
| 2,949,700 | 8/1960 | Kathrein | 99—2C |
| 3,246,989 | 4/1966 | Biehl | 99—2 |
| 3,362,829 | 1/1968 | Landfried et al. | 99—93 |

FOREIGN PATENTS

| | | | |
|---|---|---|---|
| 829,688 | 3/1960 | Great Britain | 99—2 |

NORMAN YUDKOFF, Primary Examiner

C. P. RIBANDO, Assistant Examiner

U.S. Cl. X.R.

99—17, 83